(12) United States Patent
Mickols

(10) Patent No.: US 6,280,853 B1
(45) Date of Patent: Aug. 28, 2001

(54) COMPOSITE MEMBRANE WITH POLYALKYLENE OXIDE MODIFIED POLYAMIDE SURFACE

(75) Inventor: William E. Mickols, Chanhassen, MN (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/329,462

(22) Filed: Jun. 10, 1999

(51) Int. Cl.[7] .................................................... B32B 27/08
(52) U.S. Cl. ...................................... 428/474.4; 428/474.9; 428/475.5; 428/475.8; 428/476.1; 210/500.23; 210/500.33; 210/500.35; 210/490; 210/651; 210/652; 210/653; 210/654
(58) Field of Search ............................. 428/474.4, 474.9, 428/475.5, 475.8, 476.1; 210/500.23, 500.38, 500.33, 500.34, 500.35, 490, 651–654

(56) References Cited

U.S. PATENT DOCUMENTS

| | | | |
|---|---|---|---|
| 3,125,552 | 3/1964 | Loshaek et al. | 525/421 |
| 3,472,766 | * 10/1969 | Rosenbaum | 210/22 |
| 4,277,344 | 7/1981 | Cadotte | 210/654 |
| 4,280,970 | * 7/1981 | Kesting | 264/1.7 |
| 4,473,475 | 9/1984 | Barnes, Jr. et al. | 210/638 |
| 4,737,291 | 4/1988 | Barnes, Jr. et al. | 210/638 |
| 4,743,418 | 5/1988 | Barnes, Jr. et al. | 264/48 |
| 4,765,897 | 8/1988 | Caotte et al. | 210/500.23 |
| 4,769,148 | 9/1988 | Fibiger et al. | 210/500.38 |
| 4,828,700 | 5/1989 | Fibiger et al. | 210/500.32 |
| 4,859,384 | 8/1989 | Fibiger et al. | 264/45.1 |
| 4,960,517 | 10/1990 | Cadotte | 210/639 |
| 4,964,998 | 10/1990 | Cadotte et al. | 210/654 |
| 4,976,897 | 12/1990 | Callahan et al. | 264/425 |
| 5,266,391 | 11/1993 | Donato et al. | 428/220 |
| 5,350,805 | 9/1994 | Lin | 525/121 |
| 5,525,236 | * 6/1996 | Wilkinson | 210/651 |
| 5,658,460 | 8/1997 | Cadotte et al. | 210/500.38 |
| 5,755,964 | 5/1998 | Mickols | 210/500.37 |
| 5,942,120 | 8/1999 | Wilkinson | 210/651 |

FOREIGN PATENT DOCUMENTS

| | | |
|---|---|---|
| 0 336 999 A2 | 10/1989 | (EP) . |
| 984384 | 2/1965 | (GB) . |
| 4-94725 | * 3/1992 | (JP) . |
| WO 94/17905 | 8/1994 | (WO) . |

OTHER PUBLICATIONS

Shearwater Polymers, Inc., Catalog, Polyethylene Glycol Derivatives, 1997–1998 No month.

Belfer, S. et al., "Surface Modification of Commercial Composite Polyamide Reverse Osmosis Membranes," *Journal of Membrane Science*, 139, pp. 175–181 (1998) No month.

Derwent Abstract. XP–002146107, JP 02 279725A, "Epoxy Group Containing Polyamide Resin Prepared By Reacting CIS–Epoxy Succinic Acid Derivative With Diamine in Organic Solvent, for Paint, Adhesive, Etc.", (TOYJ) Tosoh Corporation, Nov. 15, 1990.

Copy of International Search Report from Corresponding PCT/US00/14170 No date.

Belfer et al "Surface Modification . . . " Journal of Membrane Science, 1998.*

* cited by examiner

Primary Examiner—Leszek Kiliman
(74) Attorney, Agent, or Firm—Edward W. Black

(57) ABSTRACT

A composite membrane and method for making the same, comprising a porous support and a crosslinked polyamide surface having polyalkylene oxide groups grafted thereto. The subject membrane provides improved resistance to fouling while offering excellent flux and salt passage performance. The subject method is easily adapted to commercial scale-up and does not require the use of chemical initiators.

21 Claims, No Drawings

US 6,280,853 B1

COMPOSITE MEMBRANE WITH POLYALKYLENE OXIDE MODIFIED POLYAMIDE SURFACE

BACKGROUND OF THE INVENTION

Reverse osmosis or nanofiltration membranes are used to separate dissolved or dispersed materials, i.e., solute, from a solvent or a dispersing medium, e.g., water. This is accomplished because the membranes are selectively permeable to certain components of the mixture to be separated. Usually, water is the component to which such membranes are permeable. The separation process typically involves bringing an aqueous feed solution into contact with one surface of the membrane under pressure so as to effect permeation of the aqueous phase through the membrane while permeation of the dissolved or dispersed materials is prevented.

Both reverse osmosis and nanofiltration membranes usually have a discriminating layer fixed to a porous support and are referred to as composite membranes. Ultrafiltration and microfiltration membranes may also have a composite arrangement. The support provides physical strength but offers little resistance to the flow rate due to its porosity. On the other hand, the discriminating layer is less porous and provides for the rejection of the dissolved or dispersed materials. Therefore, it is generally the discriminating layer which determines the rejection rate, i.e., the percentage of the particular dissolved material that is rejected, and the flux, i.e., the flow rate at which solutions pass through the membrane.

Reverse osmosis membranes and nanofiltration membranes vary from each other with respect to their degree of impermeability to different ions and organic compounds. Reverse osmosis membranes are relatively impermeable to virtually all ions, including sodium chloride. Therefore, reverse osmosis membranes are widely used for the desalination of brackish water or seawater to provide relatively non-salty water for industrial, commercial, or domestic use because the rejection rate of NaCl for reverse osmosis membranes is usually from about 95 to about 100 percent.

On the other hand, nanofiltration membranes are usually more specific for the rejection of ions. Generally, nanofiltration membranes reject divalent ions, including radium, magnesium, calcium, sulfate, and nitrate. In addition, nanofiltration membranes are generally impermeable to organic compounds having molecular weights above about 200. Additionally, nanofiltration membranes generally have higher fluxes than reverse osmosis membranes. These characteristics render nanofiltration membranes useful in such diverse applications as the "softening" of water and the removal of pesticides from water. As an example, nanofiltration membranes generally have a NaCl rejection rate of from about 0 to about 95 percent but have a relatively high rejection rate for salts such as magnesium sulfate and in some cases organic compounds such as atrazine.

Among particularly useful membranes for reverse osmosis and nanofiltration applications are those in which the discriminating layer is a polyamide. The polyamide discriminating layer for reverse osmosis membranes is often obtained by an interfacial polycondensation reaction between a polyfunctional aromatic amine and a polyfunctional acyl halide as described in, for example, U.S. Pat. No. 4,277,344, which is incorporated herein by reference. In contrast to reverse osmosis membranes, the polyamide discriminating layer for nanofiltration membranes is typically obtained via an interfacial polymerization between a piperazine or an amine substituted piperidine or cyclohexane and a polyfunctional acyl halide as described in U.S. Pat. Nos. 4,769,148 and 4,859,384. Another way of obtaining polyamide discriminating layers suitable for nanofiltration is via the methods described in, for example, U.S. Pat. Nos. 4,765,897; 4,812,270; and 4,824,574. These patents describe changing a reverse osmosis membrane, such as those of U.S. Pat. No. 4,277,344, into a nanofiltration membrane.

Membrane fouling is a concern in many membrane applications. "Fouling" describes the collection of debris and organic material on the membrane surface which results in reduced flux. This material typically includes tannic and humic acids, proteins, carbohydrates, bacteria and other organic material commonly found in water sources. Surfactants can also be a significant source of membrane fouling. These materials associate with the membrane surface and reduce membrane solubility, resulting in reduced flux.

S. Belfer et al. in the *Journal of Membrane Science*, volume 139, no. 2, pages 175–181 (1998) describes a method for inhibiting membrane fouling by radically grafting methacrylic acid or polyethylene glycol methacrylate directly on the polyamide surface of commercial RO composite membranes, (e.g., "FT-30 BW™", available from FilmTec Corporation). This method requires the use of redox initiators (potassium persulfate-sodium metabisulfite) to form a radical species which subsequently react with the membrane surface to form a graft therewith. Unfortunately, once the radical is formed, it is very reactive and must be contacted with the membrane's surface shortly after being formed; otherwise the radical will react with others species present rather than the membrane surface. As a consequence, this process is difficult to adapt to commercial scale and requires additional handling of chemical initiators.

Thus, methods are sought for modifying the surface of composite membranes to reduce fouling. Moreover, methods are sought which are adaptable to commercial scale membrane fabrication, preferably without the use of chemical initiators. Furthermore, it is desired that such membranes achieve reduced fouling without significantly compromising membrane performance in terms of flu and solute passage (e.g., salt passage).

SUMMARY OF THE INVENTION

The present invention provides reduced fouling composite membranes and methods for making the same. In addition to reducing fouling, preferred embodiments of the present invention also improve solute passage preformance. Although the present invention has perhaps the greatest utility with respect to reverse osmosis and nanofiltration membranes, the present invention is also applicable to other filtration membranes including, but not limited to, ultrafiltration and microfiltration membranes.

The present method is adaptable to commercial scale membrane manufacturing and preferably does not include the use of chemical initiators. More specifically, the subject method includes modifying the surface of a composite membrane comprising a porous support and a crosslinked polyamide discriminating layer by chemically grafting polyalkylene oxide groups onto the surface of the discriminating layer; wherein the polyalkylene oxide groups are the same or different and are represented by the formula:

herein: x is the same or different and is 2 or 3; y is the same or different and is from about 2 to about 1000; R is the same or different and is selected from: hydrogen, E, and an alkyl or alkenyl group having from 1 to 4 carbon atoms; L is the same or different and is selected from: a linking bond or a linking group which is substantially non-reactive while the polyalkylene oxide group is chemically grafted to the discriminating layer; and E is the same or different and is selected from non-acrylate, electrophilic groups reactive with the functional groups present on the surface of the discriminating layer to form a covalent chemical bond therewith.

DETAILED DESCRIPTION OF THE INVENTION

The present invention is a composite membrane including a fouling resistant surface and methods for making the same. More specifically, the subject invention includes a composite membrane comprising a porous (also referred to as "microporous") support and a relatively thin crosslinked polyamide discriminating layer. As per the present invention, polyalkylene oxide groups are grafted to the surface of a crosslinked polyamide discriminating layer. This grafting may be accomplished as a post-treatment on a pre-made membrane, such as a composite polyamide reverse osmosis membrane, e.g., "FT-30™" available from FilmTec Corporation. Alternatively, the subject grafting may be accomplished during membrane fabrication, e.g., just after the initiation of the interfacial polymerization of the polyamine and polyfunctional acyl halide reaction. The presence of these polyalkylene oxide groups provides the membrane with a surface which is less prone to fouling.

In commercial scale operations, composite membranes are typically made by coating a microporous support with an aqueous solution of a polyfunction amine monomer, i.e., "polyamine" as part of a continuous operation. As previously indicated, the polyamine may have primary or secondary amino groups and may be aromatic or aliphatic. Examples of preferred polyamine species include primary aromatic amines having two or three amino groups, most especially m-phenylene diamine, and secondary aliphatic amines having two amino groups, most especially piperazine. The polyamine is typically applied to the microporous support as a solution in water. The aqueous solution contains from about 0.1 to about 20 weight percent, preferably from about 0.5 to about 6 weight percent polyamine. Once coated on the microporous support, excess aqueous polyamine solution may be optionally removed.

The coated microporous support is then contacted with a monomeric polyfunctional acyl halide preferably in a non-polar organic solvent, although the polyfunctional acyl halide may be delivered from a vapor phase (for polyacyl halides having sufficient vapor pressure). The polyfunctional acyl halides are preferably aromatic in nature and contain at least two and preferably three acyl halide groups per molecule. Because of their lower cost and greater availability, chlorides are generally preferred over the corresponding bromides or iodides. One preferred polyfunctional acyl halide is trimesoyl chloride. The polyfunctional acyl halide is typically dissolved in a non-polar organic solvent in a range of from 0.01 to 10.0 percent by weight, (more preferrably 0.05 to 3 weight percent), and delivered as part of a continuous coating operation. Suitable non-polar organic solvents are those which are capable of dissolving polyfunctional acyl halides and which are immiscible with water. Preferred solvents include those which do not pose a threat to the ozone layer and yet are sufficiently safe in terms of their flashpoints and flammability to undergo routine processing without having to undertake extreme precautions. Higher boiling hydrocarbons, i.e., those with boiling points greater than about 90° C. such as $C_8$–$C_{14}$ hydrocarbons and mixtures thereof have more favorable flashpoints than their $C_5$–$C_7$ counterparts but they are less volatile.

Once brought into contact with the aqueous polyamine solution coated on the microporous support, the polyfunctional acyl halide reacts with the polyamide at the surface interface to form a crosslinked polyamide discriminating layer. The reaction time is typically less than one second but contact time is often from one to sixty seconds, after which excess liquid may optionally be removed, e.g., by way of an air knife, water baths and/or a dryer. The removal of the excess water and/or organic solvent is most conveniently achieved by drying at elevated temperatures, e.g., from about 40° C. to about 120° C., although air drying at ambient temperatures may be used.

The subject polyalkylene oxide graft surface treatment may be accomplished via several methodologies which are easily adapted to the previously described commercial membrane fabrication processes. One example of the subject invention involves the post-treatment of pre-formed composite membranes, such as FT-30™ from FilmTec Corporation made in accordance with the general methodology provided above. The post-treatment involves contacting the pre-formed composite membrane with the subject polyalkylene oxide groups under conditions suitable for grafting to occur. Depending upon the reactivity of the end-group of the polyalkylene oxide, the application of heat or other conditions may be necessary. In the examples provided below, pre-formed membranes are submerged in heated aqueous solutions containing polyethylene diepoxide. The epoxide functionality requires a heated solution for optimum grafting.

Alternatively, the subject grafting may be performed as part of the membrane fabrication process. In one preferred embodiment, the subject polyalkylene oxide material is contacted with a just-formed polyamide discriminating layer (i.e., after the addition of the polyfunctional acyl halide) prior to any contact with water baths or drying steps. This may be accomplished by coating the polyamide layer by means similar to that used to coat the micoporous support with the aqueous polyamine solution. In such embodiments, the polyalkylene oxide species may include highly reactable end groups such as isocyanates, amines, and thiols which are very reactive with acid chloride groups or amines could react with the isocyanate present on the polyamide discriminating layer, but are otherwise stable.

In another embodiment, the polyalkylene oxide materials are contacted with the polyamide surface just prior to the passage of the membrane through a dryer. In commercial operations the dryer is typically used to remove residual organic solvent or solutions from the water baths; however, the heat of the dryer may be used to initiate grafting of the polyalkylene oxide to the polyamide surface. Polyalkylene oxide units having epoxy end groups are particularly adapted to this methodology. These epoxide end groups typically react with free amine and carboxylic acid moieties on the membrane surface, particularly at dryer temperatures above about 30° C.

The subject methods are preferred over prior art methods which accomplish grafting by redox initiators as the subject methods may be more easily integrated into conventional composite membrane manufacturing. More specifically, the redox initiators required by the prior art approach form highly reactive species which tend to be unstable. As such, the reactants can not be easily maintained in storage for continuous operations; rather, they must be made up and quickly used.

The polyalklene oxide groups used to treat the polyamide discriminating layer may be in solution, neat, or even a gas phase so long as it can be contacted with the polyamide.

The solvent may be any solvent in which the polyalklene oxide group is soluble so long as the flux enhancement and the performance of the membrane is not hindered by contact with the solvent. Typical solvents may include water and organic compounds such as alcohols and hydrocarbons provided the support is not dissolved by the solvent.

The grafting step is preferably accomplished without the use of chemical initiators, such as the redox initiator system described above. The polyalkylene oxide groups utilized in the subject method are represented by the following formula:

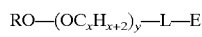

$$RO\text{---}(OC_xH_{x+2})_y\text{---}L\text{---}E$$

wherein the individual symbols are defined below. x is the same or different and is 2 or 3. y is the same or different and is from about 2 to about 1000 and is preferably from 4 to 10. R is the same or different and is selected from: hydrogen, E, and an alkyl or alkenyl group having from 1 to 4 carbon atoms which may be branched or unbranched. R is preferably hydrogen, particularly when it is desirable to improve the solubility of the polyalkylene oxide material. L is the same or different and is selected from: a linking bond or a linking group. The selection of L is not particularly critical so long as the linking bond or group is substantially non-reactive while the polyalkylene oxide group is chemically grafted to the discriminating layer. Specific examples of suitable groups include: a chemical bond, alkyl phenyl ester, ether, oxygen, sulfide, urethane, amide, amine, metal, phosphate, and sulfone. L is preferably an ether group and an alkyl group having from 1 to 12 carbon atoms. E is the same or different and is selected from non-acrylate, electrophilic groups reactive with the functional groups present on the surface of the discriminating layer to form a covalent chemical bond therewith, preferably without the use of a chemical initiator. Specific examples include groups comprising: succinimidyl esters, succinimidyl amides, succinimidylimides, oxycarbonyldimidazoles, azides, epoxides, aldehydes, tresylates, isocyanates, sulfones, (e.g., vinylsulfone), nitrophenyl carbonates, trichlorophenyl carbonates, benzotriazole carbonates, glycidyl ethers, silanes, anhydrides, amines (including aliphatic, heterocyclic, aromatic), hydroxyl, and thiols. E is preferably an amine or epoxide group (e.g., glycidyl ether). Amine groups are reactive with and form a chemical graft with acid chloride groups; whereas epoxide groups react with free amines, hydroxyls and carboxylic acid groups on the surface.

The phrase "the same or different" is intended to mean that individual polyalkylene polymers grafted to the membrane surface may be different from one another, e.g., both polyethylene oxide and polypropylene oxide polymers may be used, or copolymers of ethylene and propylene oxide may be present in a given polymer. Moreover, individual polymers may have different "L", "E" and "R" groups.

Examples of commercially available polyalkylene oxide materials suitable for use in the present invention are commercially available from Shearwater Polymers, Inc., 2305 Spring Branch Road, Huntsviile Ala. 35801.

The material of construction of the porous support of the composite membrane is not critical to the invention. Any porous support that provides physical strength to the discriminating layer may be employed, so long as the pore sizes are sufficiently large to permit the unhindered passage of permeate but not so large as to interfere with the bridging-over of the resulting discriminating layer. Typical pore sizes will range from 10 to 1,000 nanometers. Typical support materials that are known in the art include cellulose esters, polysulfones, polyether sulfones, polyvinyl chloride, chlorinated polyvinyl chloride, polyvinylidene fluoride, polystyrenes, polycarbonates, polyimides, polyacrylonitriles, and polyesters. A particularly preferred class of support materials are polysulfones. Preparation of such supports are described in U.S. Pat. Nos. 3,926,798; 4,039,440; and 4,277,344, all of which are incorporated herein by reference. The thickness of the microporous support is usually 25 to 125 micrometers, and preferably from 40 to 75 micrometers.

A variety of membrane shapes are commercially available and useful in the present invention. These include spiral wound, hollow fiber, tubular, or flat sheet type membranes. In regard to the composition of the membrane, often the discriminating layer has hygroscopic polymers other than the polyamide coated upon the surface of the discriminating layer. Among these polymers are polymeric surfactants, polyvinyl alcohol, and polyacrylic acid. The presence of these polymers will generally not affect the invention so long as the subject polyalkylene oxide material and the polyamide discriminating layer come into contact. If the membrane is to be contacted after it is in final membrane form, then the shape and composition of the membrane should be such that the polyamide discriminating layer is capable of being contacted with the above-described polyalkylene oxide compounds.

As used herein the following terms have the definitions provided: "rejection rate" is the percentage of a particular dissolved or dispersed material (i.e., solute) which does not flow through the membrane with the solvent. The rejection rate is equal to 100 minus the percentage of dissolved or dispersed material which passes through the membrane, i.e., solute passage, "salt passage" if the dissolved material is a salt. "Flux" is the flow rate at which solvent, typically water, passes through the membrane. "reverse osmosis membrane" is a membrane which has a rejection rate for NaCl of from about 95 to about 100 percent. "Nanofiltration membrane" is a membrane which has a rejection rate for NaCl of from about 0 to about 95 percent and has a rejection rate for at least one divalent ion or organic compound of from about 20 to about 100 percent. "Polyamide" is a polymer in which amide linkages (—C(O)NH—) occur along the molecular chain. "Polyalkylene oxide groups" includes both polyalkylene oxide polymers, e.g., polyethylene diepoxide, and the polyalkylene oxide moiety once grafted to the surface of the discriminating layer, unless otherwise specified.

SPECIFIC EMBODIMENTS OF THE INVENTION

The following examples illustrate the invention and should not be construed to limit the scope of the appended claims.

EXAMPLE 1

FT-30 reverse osmosis composite membranes were obtained from FilmTec Corporation of Edina, Minn. Aqueous treatment solutions were prepared by heating the appropriate quantity of water to 60° C., unless otherwise stated, followed by the addition of the appropriate quantity poly (ethylene glycol)$_n$ diglycidyl ether (CAS #26403-72-5), hereinafter referred to as "PEG diepoxide", available from Polyscience Inc. of Warrington, Pa. The membranes were submerged in the PEG diepoxide solutions for approximately ten minutes. The membranes were then tested utilizing an aqueous test solution containing approximately 2000 ppm NaCl at a transmembrane pressure of 225 psi. The results of this testing are provided in Tables 1–3. The membranes treated with PEG diepoxide showed improved resistance to fouling.

TABLE 1

| Concentration of PEG diepoxide (%), mw = 3400 | Percent Salt Passage | Flux (gfd) |
| --- | --- | --- |
| 0.0 (not heated) | 0.964 | 29.50 |
| 0.0 | 0.689 | 22.44 |
| 1.0 | 0.349 | 6.05 |
| 2.0 | 0.587 | 4.79 |
| 4.0 | 0.421 | 4.70 |

TABLE 2

| Concentration of PEO diepoxide (%), mw = 200 | Percent Salt Passage | Flux (gfd) |
| --- | --- | --- |
| 0.0 (not heated) | 0.769 | 29.58 |
| 0.0 | 0.634 | 24.29 |
| 0.2 | 0.249 | 9.59 |
| 0.4 | 0.390 | 8.25 |
| 1.2 | 0.267 | 6.32 |

As shown in Tables 1 and 2, treatment solutions having relatively lower concentrations of PEG diepoxide provided improved salt passage and higher flux than those treated with higher concentrations.

TABLE 3

| Temperature of Treatment Solution* (C.°) | Percent Salt Passage | Flux (gfd) |
| --- | --- | --- |
| 30 | 0.705 | 21.31 |
| 40 | 0.508 | 19.00 |
| 50 | 0.512 | 13.34 |
| 60 | 0.401 | 11.88 |
| 70 | 0.493 | 9.05 |

*0.037 weight percent poly (ethylene glycol)$_n$ diglycidyl ether wherein n = 600

Higher temperature treatments tended to reduce flux but improved salt passage. Treatment temperatures less than about 60° C. are preferred and temperatures from about 40° C. to about 50° C. are still more preferred.

EXAMPLE 2

"LE 440™" composite membranes were obtained from FilmTec Corporation of Edina, Minn. The test membrane was pre-treated by soaking the membrane in water at 50° C. for thirty minutes followed by the treatment described above in Example 1. The treatment solution consisted of a 0.3 percent PEG diepoxide (molecular weight of approximately 200) solution. The membranes were then tested utilizing a test solution comprising an aqueous solution containing approximately 1500 ppm NaCl, at a transmembrane pressure of 150 psi. After constant usage under these conditions for three hours, the flux was measured to establish a baseline flux. Subsequently, the test solution, was replaced with an aqueous solution containing approximately 1500 ppm NaCl and 100 mM of dodecylitrimethyl ammonium bromide, (referred to in Table 4 as "surfactant A") which was applied for three hours after which time the flux of the membrane was measured and is expressed below as a percentage of the baseline flux. Purified water was then used to rinse the membranes for two hours at 150 psi, followed by measuring the flux of a 2000 ppm NaCl solution. The flux measurement was expressed as a percentage of the baseline flux. Subsequently, the test solution was replaced with an aqueous solution containing approximately 1500 ppm NaCl and 100 ppm of sodium dodecyl sulfate (referred to in Table 4 as "surfactant B"), which was applied for three hours after which time the flux of the membrane was measured and is expressed below as a percentage of the baseline flux. The test solution was then used to rinse the membranes for two hours at 150 psi followed by a flux measurement expressed as a percentage of the baseline flux.

TABLE 4

| Sample | % Flux with Surfactant A | % Flux after 2 hr Rinse | % Flux with Surfactant B | % Flux after 2 hr Rinse |
| --- | --- | --- | --- | --- |
| Untreated | 78 | 85 | 69 | 84 |
| Treated | 89 | 94 | 80 | 100 |

As can be seen by the data provided in Table 4, the membrane treated according to the present method was much more resistant to fouling by surfactants, as indicated by the relatively high percent flux maintained after prolonged exposure to surfactants.

Similar results were obtained when similar test was conducted substituting the surfactants provided in Example 2 with tannic acid.

What is claimed is:

1. A method for modifying the surface of a composite membrane comprising a porous support and a crosslinked polyamide discriminating layer by chemically grafting polyalkylene oxide groups to the surface of the discriminating layer; wherein the polyalkylene oxide groups are the same or different and are represented by the formula:

wherein:
x is the same or different and is 2 or 3;
y is the same or different and is from about 2 to about 1000;
R is the same or different and is selected from hydrogen, E, and an alkyl or alkenyl group having from 1 to 4 carbon atoms;
L is the same or different and is selected from a linking bond or a linking group which is substantially non-reactive while the polyalkylene oxide group is chemically grafted to the discriminating layer; and
E is the same or different and is selected from non-acrylate, electrophilic groups reactive with the functional groups present on the surface of the discriminating layer to form a covalent chemical bond therewith.

2. The method of claim 1 wherein E is selected from the groups comprising: succinimidyl esters, succinimidyl amides, succinimidylimides, oxycarbonyldimidazoles, azides, epoxides, aldehydes, tresylates, isocyanates, sulfones, nitrophenyl carbonates, trichlorophenyl carbonates, benzotriazole carbonates, glycidyl ethers, silanes, anhydrides, amines, hydroxyl, and thiols.

3. The method of claim 2 wherein E is selected from at least one of: amine and epoxide groups.

4. The method of claim 1 wherein E is chemically reacted with at least one of the following functional groups on the surface of the discriminating layer to form a chemical graft: carboxylic acid, acid chloride and amine.

5. The method of claim 1 wherein L is selected from the group comprising: alkyl, phenyl, ester, ether, oxygen, sulfide, urethane, amide, amine, metal, phosphate, and sulfone.

6. The method of claim 5 wherein L is selected from at least one of an ether group and an alkyl group having from 1 to 12 carbon atoms.

7. The method of claim 1 wherein R is hydrogen.

8. The method of claim 1 wherein y is from 4 to 10.

9. The method of claim 1 wherein the polyalkylene oxide groups are grafted to the surface of polyamide discriminating layer by contacting the discriminating layer with a solution containing the polyakylene oxide groups.

10. The method of claim 9 wherein the solution containing the polyalkylene oxide groups has a temperature from about 30° C. to about 70° C.

11. The method of claim 10 wherein the solution containing the polyalkylene oxide groups has a temperature less than about 60° C.

12. The method of claim 9 wherein the membrane is heated after being contacted with solution containing the polyalkylene oxide groups.

13. A composite membrane comprising a porous support and a crosslinked polyamide discriminating layer, wherein polyalkylene oxide groups represented by the formula provide below are chemically grafted to the surface of the discriminating layer;

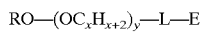

RO—(OC$_x$H$_{x+2}$)$_y$—L—E wherein:
x is the same or different and is 2 or 3;
y is the same or different and is from about 2 to about 1000;
R is the same or different and is selected from: hydrogen, E, and an alkyl or alkenyl group having from 1 to 4 carbon atoms;
L is the same or different and is selected from: a linking bond or a linking group which is substantially non-reactive while the polyalkylene oxide group is chemically grafted to the discriminating layer; and
E is the same or different and is selected from non-acrylate, electrophihic groups reactive with the functional groups present on the surface of the discriminating layer to form a covalent chemical bond therewith without the use of a chemical initiator.

14. The membrane of claim 13 wherein E is selected from the groups comprising: succinimidyl esters, succinimidyl amides, succinimidylimides, oxycarbonyldimidazoles, azides, epoxides, aldehydes, tresylates, isocyanates, sulfones, nitrophenyl carbonates, trichlorophenyl carbonates, benzotriazole carbonates, glycidyl ethers, silanes, anhydrides, amines, hydroxyl, and thiols.

15. The membrane of claim 14 wherein E is selected from at least one of: amine and epoxide groups.

16. The membrane of claim 14 wherein E is reactive with at least one of the following functional groups on the surface of the discriminating layer: carboxylic acid, acid chlorides and amines.

17. The membrane of claim 13 wherein L is selected from the group comprising: alkyl, phenyl, ester, ether, oxygen, sulfide, urethane, amide, amine, metal, phosphate, and sulfone.

18. The membrane of claim 17 wherein L is selected from at least one of an ether group and an alkyl group having from 1 to 12 carbon atoms.

19. The membrane of claim 13 wherein R is hydrogen.

20. The membrane of claim 13 wherein y is from 4 to 10.

21. The membrane of claim 13 wherein the polyalkylene oxide groups chemically grafted to the surface of the discriminating layer provide the membrane with a higher rejection rate.

* * * * *